(12) United States Patent
Affre De Saint Rome (10) Patent No.: US 8,727,276 B2
(45) Date of Patent: *May 20, 2014

(54) ANCHORING HARPOON INTENDED IN PARTICULAR FOR AN AIRCRAFT AND ANCHORING SYSTEM INCLUDING ONE SUCH HARPOON

(75) Inventor: Ronan Affre De Saint Rome, Carantec (FR)

(73) Assignee: DCNS, Paris (FR)

( * ) Notice: Subject to any disclaimer, the term of this patent is extended or adjusted under 35 U.S.C. 154(b) by 60 days.

This patent is subject to a terminal disclaimer.

(21) Appl. No.: 13/260,740

(22) PCT Filed: Jan. 19, 2010

(86) PCT No.: PCT/FR2010/050076
§ 371 (c)(1),
(2), (4) Date: Nov. 30, 2011

(87) PCT Pub. No.: WO2010/112717
PCT Pub. Date: Oct. 7, 2010

(65) Prior Publication Data
US 2012/0068013 A1    Mar. 22, 2012

(30) Foreign Application Priority Data
Apr. 3, 2009 (FR) ...................................... 0952177

(51) Int. Cl.
*B64F 1/12* (2006.01)
(52) U.S. Cl.
USPC ........ 244/115; 244/114 R; 244/1 R; 411/347; 411/378; 114/206; 114/294
(58) Field of Classification Search
USPC ............. 244/114 R, 115, 1 R; 411/347, 378; 114/206, 294; 52/153, 161, 160, 156; 248/156, 160, 161, 188.8; 294/192, 294/195
See application file for complete search history.

(56) References Cited

U.S. PATENT DOCUMENTS 1,796,147 A * 3/1931 Green et al. ..................... 52/161
3,054,123 A * 9/1962 Moeller ........................... 441/25

(Continued)

FOREIGN PATENT DOCUMENTS

EP    547275 A1 * 6/1993   ............... B64F 1/12
FR   1 558 804 A    2/1969

(Continued)

OTHER PUBLICATIONS

International Search Report, dated Jun. 7, 2010, from corresponding PCT application.

*Primary Examiner* — Isam Alsomiri
*Assistant Examiner* — Assres H Woldemaryam
(74) *Attorney, Agent, or Firm* — Young & Thompson (57) ABSTRACT

An anchoring harpoon intended in particular for an aircraft, capable of cooperating with an anchoring grate of a platform, includes jack elements including a cylinder element containing mobile piston elements provided with a rod that extends beyond the cylinder element, the free end of which includes a harpoon head (7) that is hooked in the grate and includes retaining fingers (8, 13, 14) that can be moved between a retracted position and an active position by control elements (9). The control element (9) for controlling the movements of the fingers include a control piston (18) which can slide inside the rod of the jack and which is associated with a bistable actuator (19) of the fingers, capable of moving between a retracted position and an active position in which the fingers are deployed with the application of successive pressure pulses in the jack elements.

17 Claims, 5 Drawing Sheets

(56) References Cited

U.S. PATENT DOCUMENTS

| | | | |
|---|---|---|---|
| 3,151,826 A | | 10/1964 | Michel |
| 3,154,042 A | * | 10/1964 | Thomason et al. ............ 114/295 |
| 3,430,305 A | * | 3/1969 | Geffner ............................ 24/603 |
| 3,502,286 A | * | 3/1970 | Warren ....................... 244/17.17 |
| 3,552,688 A | | 1/1971 | Baekken |
| 3,577,949 A | * | 5/1971 | Mueller et al. ................ 114/295 |
| 3,653,139 A | * | 4/1972 | Temple et al. ................... 42/106 |
| 4,275,680 A | * | 6/1981 | Pennington et al. ........... 114/295 |
| 4,381,092 A | * | 4/1983 | Barker ......................... 244/172.4 |
| 5,080,304 A | * | 1/1992 | Stump et al. ................... 244/115 |
| 5,209,431 A | * | 5/1993 | Bernard et al. ............. 244/17.17 |
| 5,480,108 A | * | 1/1996 | Amiand et al. ................ 244/115 |
| 5,971,072 A | * | 10/1999 | Huber et al. ................... 166/297 |
| 6,176,519 B1 | * | 1/2001 | Limingoja ..................... 280/762 |
| 7,104,505 B2 | * | 9/2006 | Tchoryk et al. ............. 244/172.4 |
| 7,275,889 B1 | * | 10/2007 | McGill .............................. 404/6 |
| 2008/0003077 A1 | * | 1/2008 | Anderson ...................... 411/347 |
| 2011/0233332 A1 | * | 9/2011 | Proutiere ....................... 244/115 |

FOREIGN PATENT DOCUMENTS

| | | | | |
|---|---|---|---|---|
| FR | 2 701 689 A1 | 8/1994 | | |
| GB | 923 864 A | 4/1963 | | |
| WO | WO 9013480 A1 | * | 11/1990 | ................ B64F 1/12 |
| WO | 91/04910 A1 | 4/1991 | | |

* cited by examiner

ANCHORING HARPOON INTENDED IN PARTICULAR FOR AN AIRCRAFT AND ANCHORING SYSTEM INCLUDING ONE SUCH HARPOON

The present invention concerns an anchoring harpoon intended in particular for an aircraft able to cooperate with an anchoring grate of a platform, and an anchoring system including one such harpoon.

Such harpoons and such anchoring systems are already generally known in the state of the art.

Thus for example, document FR-A-2 701 689 describes a harpoon intended to equip a rotocraft such as a helicopter, for example, and that can be pulled towards a landing platform of a vessel so that the head of the harpoon attaches on the grate and thus forms an anchoring point of the aircraft, in particular facilitating the landing operation thereof.

The anchoring harpoon described in the aforementioned document includes cylinder means wherein piston means move provided with a shaft extending beyond the cylinder means and the free end of which includes a harpoon head for hooking in the grate. This harpoon head is in fact provided with retaining fingers for retention in the grate, radially movable between a retracted position and an active position using control means.

Such harpoons have already been successfully implemented on a number of vessels to ensure anchoring in particular of helicopter-type aircrafts.

For some time, a number of attempts have also been made to land drone-type rotocrafts on platforms, in particular military ones.

The applicant has also successfully developed and tested an automatic landing and take-off system for a rotary-wing drone on and from such a vessel.

The implementation of these drones also requires the use of harpoons and anchoring grates.

Studies have shown that adapting already known anchoring harpoons for helicopters directly on rotary-wing drones could not be done successfully.

Indeed, these studies have shown problems related to size, power, maintenance, etc.

The aim of the invention is therefore to resolve these problems.

SUMMARY OF THE INVENTION

To that end, the invention concerns an anchoring harpoon, intended in particular for an aircraft, able to cooperate with an anchoring grate of a platform, including jack means comprising cylinder means containing mobile piston means provided with a rod that extends beyond the cylinder means and the free end of which includes a harpoon head that is hooked in the grate, provided with retaining fingers for retention therein, that can be moved between a retracted position and an active position by control means, characterized in that the means for controlling the movements of the fingers comprise a control piston that can slide inside the rod of the jack and that is associated with a bistable actuator of the fingers, capable of moving between a retracted position and an active position in which the fingers are deployed with the application of successive pressure pulses in the jack means.

According to other features of the invention, considered separately or in combination:

the bistable actuator is a rotary mechanical jack, the bistable actuator includes a wheel with beveled teeth inserted between the control piston and a rod for actuating the fingers, positioned in a sleeve connected to the jack rod, the end of the piston opposite the wheel with beveled teeth itself including teeth, so as, when pressure pulses are applied in the jack means and therefore the control piston moves, to cause the beveled toothed wheel to rotate in the sleeve, the teeth of the wheel also being adapted to cooperate with successive notches having different heights of the sleeve, in order to define stable positions, active and retracted, of the rod for actuating the fingers, it includes a spring for stressing the rod for actuating the fingers in the retracted position, the cylinder means of the jack include at least two cylinder portions telescoping one in the other and capable of being moved between a retracted position one in the other and an active position with one protruding relative to the other, the jack means are connected to a pressurized fluid source through control means and said pressurized fluid source includes a consumable gas cartridge, the gas is $CO_2$, the control means comprise solenoid valve means steered upon opening and closing to feed the jack means, the corresponding end of the jack means is associated with the aircraft and a helical return and pressing spring is inserted between said end of the jack and the harpoon head, the helical spring is arranged around the jack means, it includes trigger means for prohibiting the movement of the fingers towards their active position when the harpoon head is not positioned abutting in the anchoring grate.

The invention also concerns an anchoring system, in particular for a drone-type rotocraft comprising an anchoring harpoon as previously described.

BRIEF DESCRIPTION OF THE DRAWINGS

The invention will be better understood using the following description, provided solely as an example, and done in reference to the appended drawings, in which.

DETAILED DESCRIPTION OF THE PREFERRED EMBODIMENTS

Figure 1:
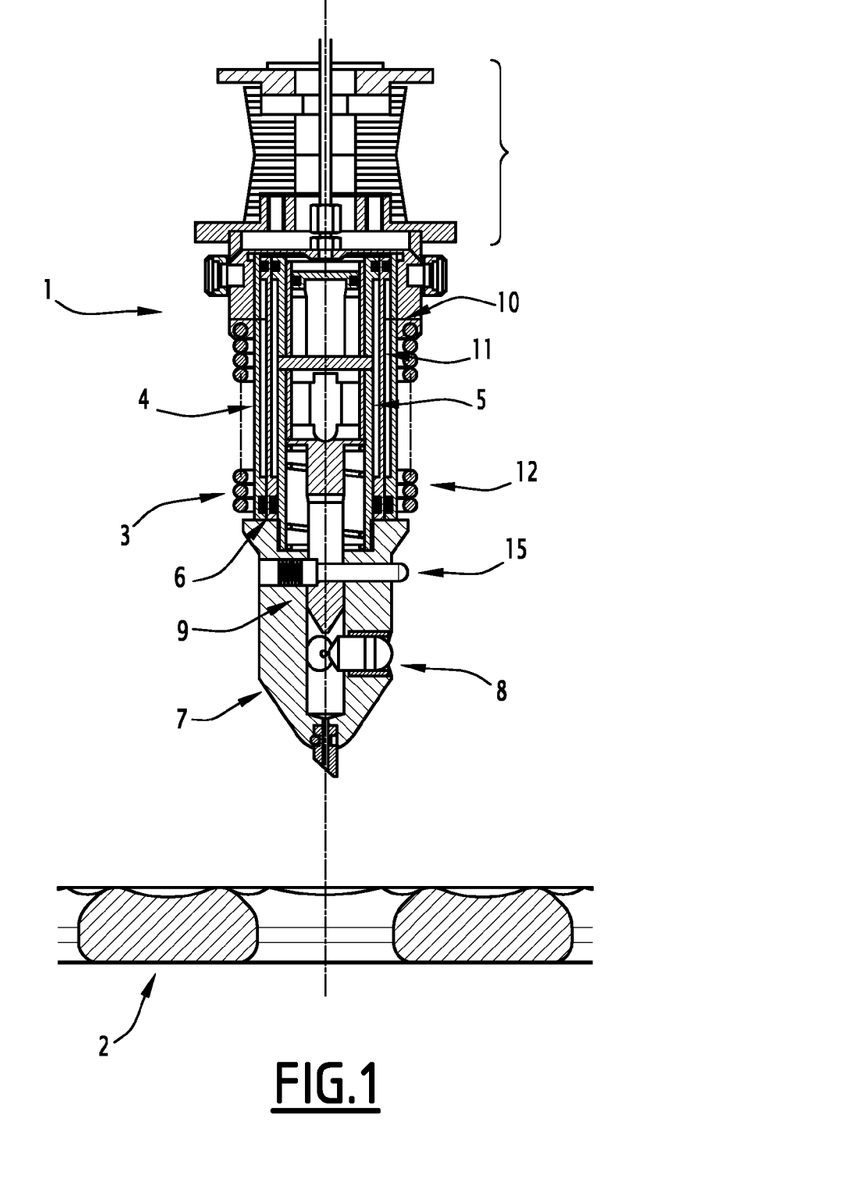
FIGS. 1 and 2 show cross-sectional views of an anchoring harpoon according to the invention in the retracted and active anchoring positions, respectively, in an anchoring grate of a platform.
Figure 2:
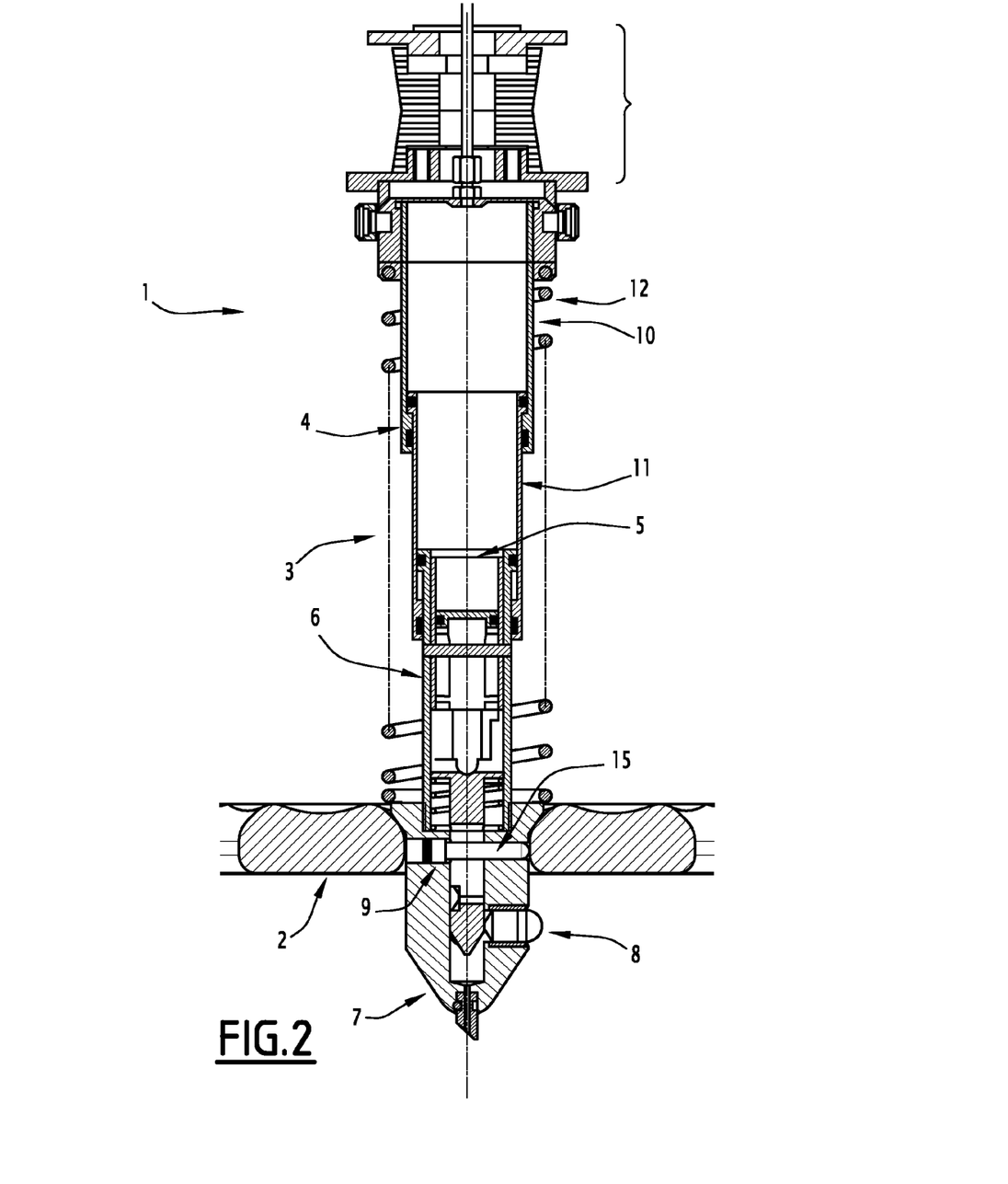

These figures, and in particular FIGS. 1 and 2, illustrate an anchoring harpoon, intended in particular for an aircraft on a platform of the military vessel type or another type.

The aircraft can for example be a rotary-wing drone.

This harpoon is designated by general reference 1 in these figures and is adapted to cooperate with an anchoring grate of the platform, this grate being designated by general reference 2 in these figures.

Indeed, the harpoon includes jack means designated by general reference 3, including cylinder means designated by general reference 4, wherein piston means designated by general reference 5 move.

These piston means are provided with a rod 6 extending beyond the cylinder means and whereof the free end includes a harpoon head that hooks in the grate, said harpoon head being designated by general reference 7.

In fact and as described in the aforementioned prior art document, this harpoon head is provided with retaining fingers for retention in the grate, capable of being radially moved between a retracted position and an active position by control means, as will be described in more detail hereinafter.

In these figures, one of the fingers is designated by general reference 8 and the control means thereof by general reference 9.

Figure 3:
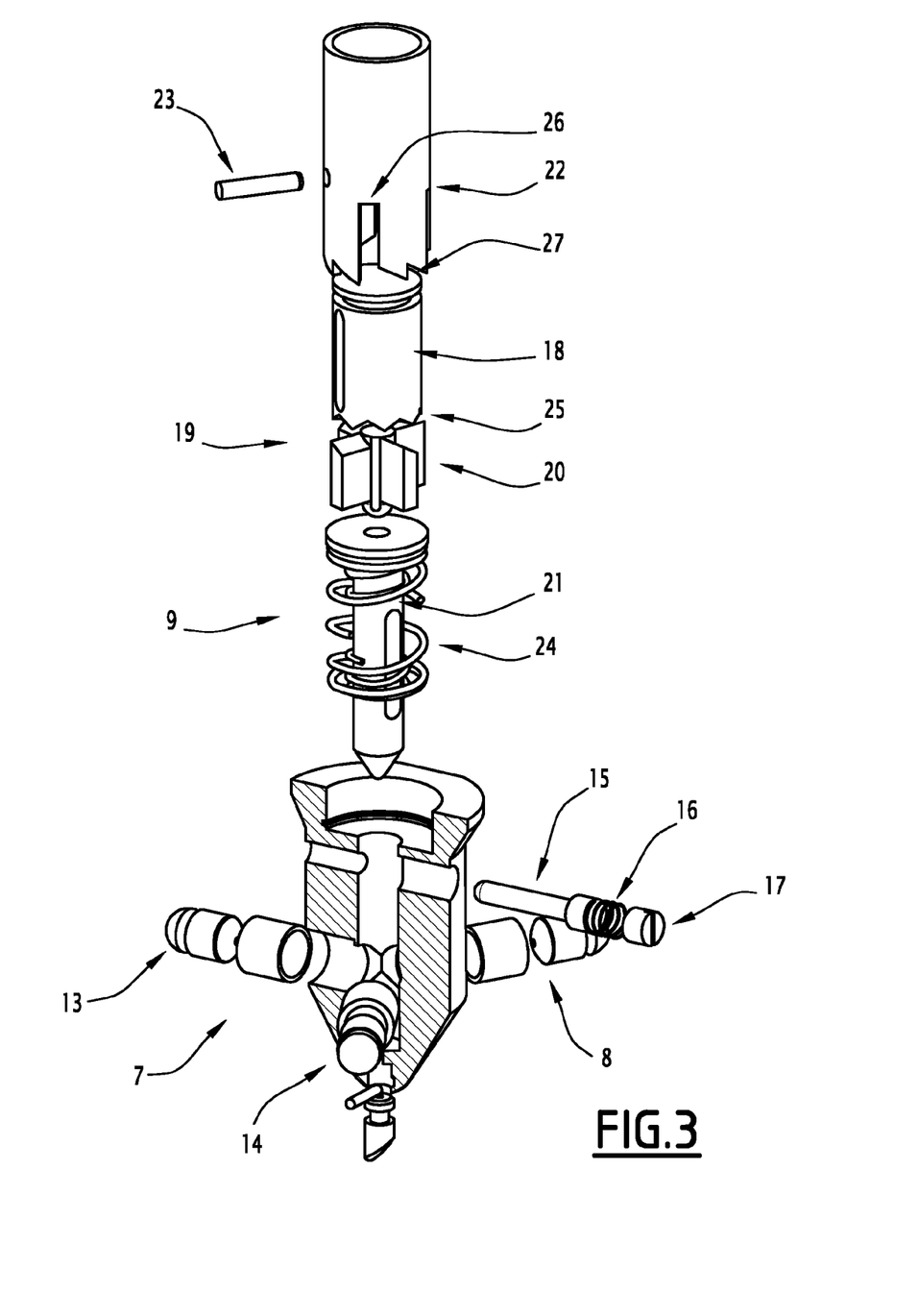
FIG. 3 illustrates an exploded perspective view of a hooking harpoon head included in a harpoon according to the invention.

The structure of these control means will also be described in more detail relative to FIG. 3.

Returning to FIGS. 1 and 2, the fingers and the control means are shown in the retracted position in FIG. 1 and the active position in FIG. 2, when the harpoon is deployed, the control means being movable in the rod to cause a radial movement of the retaining fingers between the retracted position, in FIG. 1, in the head of the harpoon, and the active retaining position in FIG. 2, radially protruding relative to said head to lock it in the grate.

To resolve the various problems of integration in a drone, in particular as previously described, in the anchoring harpoon according to the invention, the cylinder means of the jack comprise at least two cylinder portions telescoping one in the other and capable of being moved between a position with one retracted in the other and an active anchoring position with one protruding relative to the other, as illustrated in FIGS. 1 and 2, respectively.

In these figures, the two cylinder portions telescoping one in the other are designated by references 10 and 11, respectively.

The upper cylinder portion 10 is then associated with hooking means for hooking on the drone, said means having any suitable traditional structure, while the other end of this upper cylinder portion 10 is adapted to receive the lower cylinder portion 11, which itself supports the rod 6 whereof the free end supports the harpoon head 7.

The jack means are then connected to a pressurized fluid source through control means to control their operation, i.e. the deployment of the anchoring harpoon and its hooking or unhooking relative to the anchoring grate.

To that end, a helical return and pressing spring 12 is inserted between the end of the upper cylinder portion associated with the aircraft and the harpoon head to ensure, as illustrated in FIG. 2, when the harpoon head is anchored in the grate, correct pressing of the drone on the platform.

The harpoon head 7 can be similar to that already described in the document previously mentioned and for example include three retaining fingers arranged 120° from each other and for example designated by general references 8, 13 and 14 in FIG. 3. These fingers can then be moved between a retracted position and an active position radially protruding relative to the rest of the head in order to anchor the harpoon in the grate under the control of the control means designated by general reference 9 in FIGS. 1, 2 and 3.

Also traditionally, the harpoon head 7 can include an arming trigger for these control means 9 to prohibit the movement of the fingers towards their active position when the harpoon head is not positioned abutting in the anchoring grate, i.e. in the correct anchoring position in the grate.

This trigger was also previously described and is designated by general reference 15 in FIG. 3.

This trigger 15 is then positioned transversely in the harpoon head 7, protrudes radially from the head, and is associated with a spring 16 and a stop member 17 to be pushed back in the harpoon head when the latter is in its correct position in the anchoring grate as illustrated in FIG. 2, and to allow the control means 9 and the retaining fingers to move.

The control means 9 comprise a piston designated by general reference 18 capable of sliding in the rod of the jack and associated with a bistable actuator of the fingers, capable of being moved between retracted and active, deployed positions of the fingers with the application of successive pressure pulses in the jack means.

This bistable actuator of the fingers is designated by general reference 19 and includes several pieces forming what is commonly called a rotary lock.

This bistable actuator in fact includes a wheel with beveled teeth that is designated by general reference 20 in FIG. 3, inserted between the control piston 18 and an actuating rod of the fingers designated by general reference 21 in FIG. 3.

The piston 18 and the beveled toothed wheel 20 are arranged in a sleeve designated by general reference 22 connected to the rod 6 of the jack for example through a pin designated by general reference 23.

A spring for stressing the actuating rod 21 of the fingers in the retracted position is also provided, said spring being designated by general reference 24 in FIG. 3.

The end of the piston 18 opposite the beveled toothed wheel itself includes teeth like the tooth designated by general reference 25 in that figure, so as, when pressure pulses are applied in the jack means and therefore corresponding movements of the piston 18 occur, to make the beveled toothed wheel 20 rotate in the sleeve 22. The beveled teeth 20 of the wheel are also adapted to cooperate with successive notches having different heights of the sleeve 22 in order to define stable positions, active and retracted, in the actuating rod 21 of the fingers and therefore of said fingers.

Two successive notches with different heights of the sleeve are for example designated by general references 26 and 27 in that figure.

In the retracted position of the control means 9, the teeth of the wheel 20 for example bear against the notches such as the notch 26. When pressure is applied in the jack means, the piston 18 causes the toothed wheel 20 and the actuating rod 21 to move against the elastic stress of the spring 24 if the trigger 15 is armed, i.e. pushed back, the head being in the correct position in the grate.

During this pushing, the teeth 25 of the piston 18 also tend to cause the toothed wheel to rotate. However, this rotational movement of the wheel is prevented by the cooperation of the teeth of the wheel with the edges of the sleeve 22 of each side of the notch 26 until the beveled teeth of the wheel 20 can cross the corresponding end of the sleeve 22 to cooperate with the notch 27 for maintaining the teeth and therefore of the actuating rod 21 in the active deployed position of the fingers of the hooking head.

Locking in position is thus ensured by stressing the spring 24, which pushes the actuating rod 21 and the toothed wheel 20 to remain in position against the notch 27.

The fluid pressure can then be released in the jack means while keeping the aircraft anchored in the grate.

A new application of a fluid pressure pulse in the jack means causes a new angular movement of the beveled toothed wheel opposite the following notch corresponding to the retracted position of the rod of the actuating means under the action of the spring 24 in order to unlock the head.

It of course goes without saying that other embodiments of this bistable actuator controlled by applying successive pressure pulses in the jack means can be considered.

It can thus be conceived that the use of such a bistable mechanical lock can make it possible to use only pressure pulses in the jack means and no longer requires that pressure be maintained therein as was the case with the jack means of the prior art.

A single pressure pulse indeed makes it possible to deploy the fingers, and a single additional pressure pulse makes it possible to retract them back in.

Moreover, it also makes it possible to modify the pressurized fluid supply means of the jack means.

Figure 4:
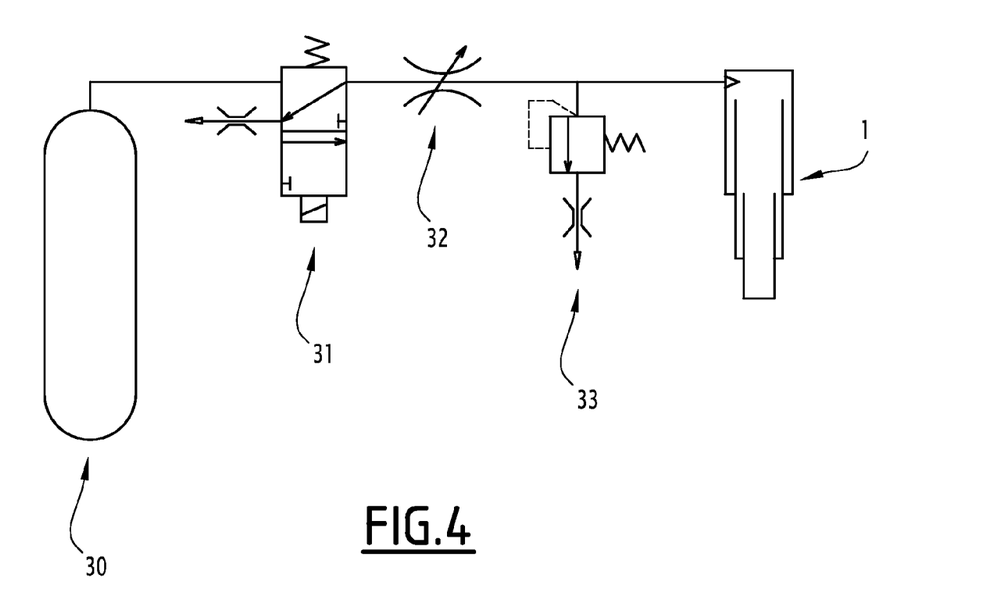
FIG. 4 shows a summary diagram illustrating the pressurized fluid supply of a harpoon according to the invention.

A summary diagram of these supply means is provided in FIG. 4.

Indeed, the supply means can include a pressurized fluid source for example assuming the form of a consumable gas cartridge, for example such as a consumable $CO_2$ cartridge, designated by general reference 30 in that figure.

This gas cartridge 30 is then removed at the inlet of the solenoid valve means 3/2 that are normally closed, designated by general reference 31, itself connected to adjustable restricting means making it possible to limit the gas flow rate during harpooning and bleeding, designated by general reference 32.

A pressure relief valve adjusted to a pressure slightly higher than the desired harpooning pressure is also provided, said valve being designated by general reference 33, the harpoon still being designated by general reference 1.

The control upon opening and closing of the solenoid valve means thus makes it possible to steer the supply of the jack means in the form of pressure pulses.

Figure 5:
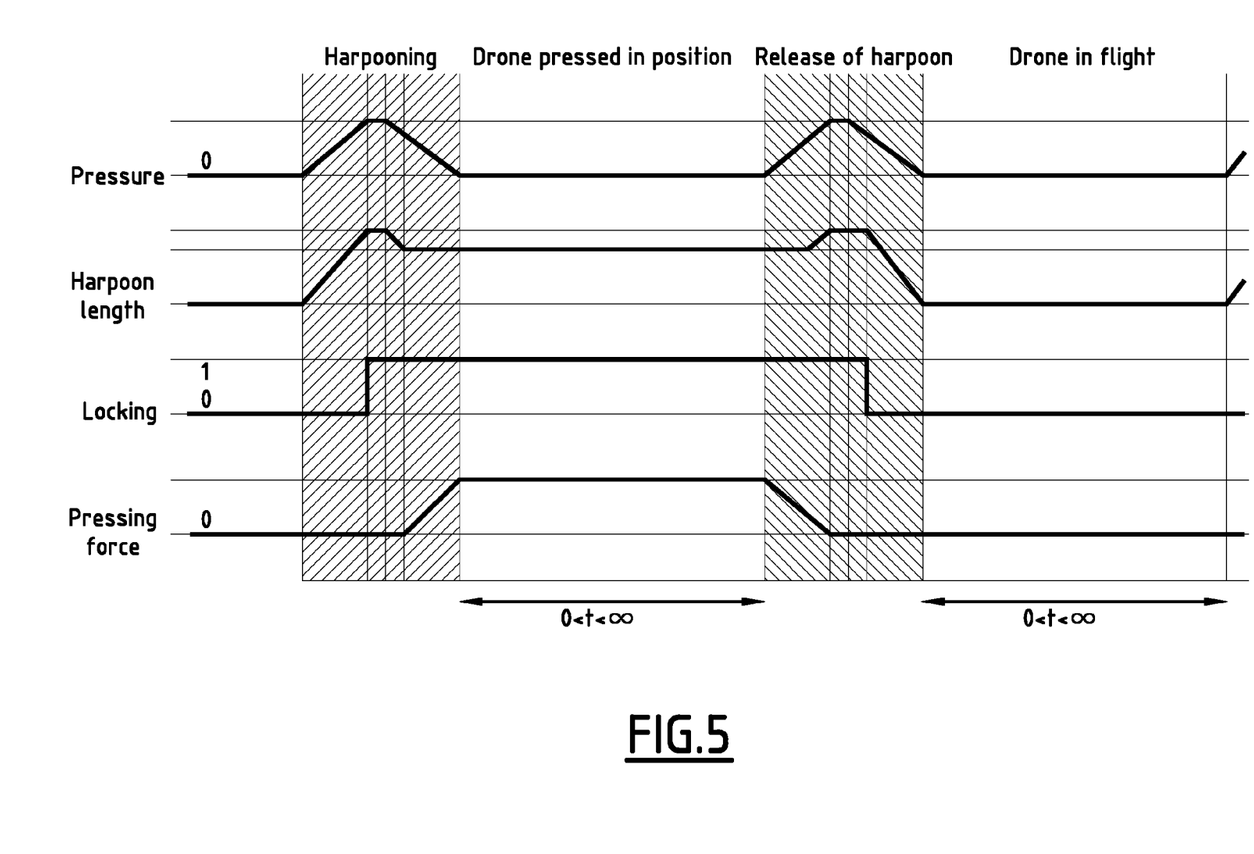
FIG. 5 illustrates the operation of such a harpoon.

This pulse-based operation is illustrated in FIG. 5, which shows that the harpooning and release of harpooning are done through successive applications of pressure pulses in the jack means, which makes it possible on one hand to deploy the telescoping harpoon, which remains in the deployed position as long as the anchoring head is locked in the grate, and which also makes it possible to obtain a force pressing the aircraft on the platform.

Applying a pressure pulse by controlling the opening of the solenoid valve means 31 previously described can allow cylinder portions of the jack means to deploy in order to make the hooking head of the harpoon penetrate the grate.

The harpoon head is then housed in a cell of the grate, which makes it possible to push back the arming trigger 15 and therefore the piston 18, under the action of the pressure of the fluid in the jack means, to push the actuating rod 21 of the fingers 8 towards the deployed position of said fingers in order to lock the head in the grate.

The rotary bistable mechanical lock makes it possible to lock the rod and the fingers in said active position anchoring the head in the grate and the fluid pressure can then be released in the jack means, the helical return and pressing spring 12 making it possible to keep the drone pressed in position on the grate.

When a new pressure pulse is applied in the jack means, the piston 18 causes the beveled toothed wheel 20 to rotate to unlock the rotary mechanical lock, which allows, when the fluid pressure is released in the jack means, the spring 24 to push the actuating rod 21 of the fingers back, towards a retracted position, and allows said fingers to return to a position retracted in the anchoring head, which releases said anchoring head from the grate and makes it possible, via the helical spring 12, to return the jack means towards a retracted position (FIG. 1).

It is then seen that such a structure has a certain number of advantages relative to the harpoons of the state of the art.

The use of a telescoping jack in fact makes it possible to double the deployment travel of the harpoon for a same folded length and therefore considerably decrease the length of the harpoon in the folded position, which makes it possible to adapt to the bulk constraints related to placing it on board a drone.

The use of a pressing and return spring placed outside the jack means also makes it possible to obtain a correct pressing force against the grate.

The use of a bistable actuator with a rotary mechanical lock makes it possible to maintain the harpoon in its position between two pulse orders to change state, i.e. folded or locked in the grate.

The transition from one state to the other is done by applying a pulse of the pressurized fluid in the jack means. This then makes it possible to use a consumable cartridge, for example a gas cartridge, associated with solenoid valve control means to ensure the supply.

Of course, different embodiments of the described parts can be considered and other applications can also be considered, for example for anchoring aircrafts on oil or other platforms.

The invention claimed is:

1. An anchoring harpoon for use with an aircraft, and configured to cooperate with an anchoring grate (2) of a platform, comprising:
    jack means (3) comprised of cylinder means (4), the cylinder means (4) containing a mobile piston (5) that is moveable with respect to the cylinder means (4), the mobile piston (5) comprising a rod (6) fixedly attached to the mobile piston (5) to move in accordance with a movement of the mobile piston (5), a free end of the rod (6) extending beyond the cylinder means, the free end of the rod (6) including a harpoon head (7) configured to hook to the anchoring grate (2),
    said harpoon head (7) comprising retaining fingers (8, 13, 14) for retention to the anchoring grate (2), said retaining fingers (8, 13, 14) being moveable between a retracted position and an active position by control means (9),
    wherein the control means (9) for controlling the movements of the retaining fingers comprise a control piston (18) that is slideable inside the rod (6) and that is associated with a bistable actuator (19) of the fingers configured to move the fingers (8, 13, 14) between the retracted position and the active position in which the fingers are deployed by way of an application of successive pressure pulses in the jack means.

2. The anchoring harpoon according to claim 1, wherein the bistable actuator is a rotary mechanical jack (19).

3. The anchoring harpoon according to claim 1, wherein the bistable actuator (19) includes a wheel with beveled teeth (20) inserted between the control piston (18) and a rod (21) for actuating the fingers, positioned in a sleeve (22) connected to the jack rod, an end of the piston (18) opposite the wheel with beveled teeth (20) itself including teeth (25), so as, when pressure pulses are applied in the jack means and therefore the control piston moves, to cause the beveled toothed wheel (20) to rotate in the sleeve (22), the teeth of the wheel (20) also being adapted to cooperate with successive notches having different heights (26, 27) of the sleeve (22), in order to define stable positions, active and retracted, of the rod (21) for actuating the fingers.

4. The anchoring harpoon according to claim 3, further comprising:
    a spring (24) for stressing the rod (21) for actuating the fingers in the retracted position.

5. The anchoring harpoon according to claim 1, wherein the jack means are connected to a pressurized fluid source (30) through control means (31) and in that said pressurized fluid source includes a consumable gas cartridge (30).

6. The anchoring harpoon according to claim 5, wherein the gas is $CO_2$.

7. The anchoring harpoon according to claim 5, wherein the control means comprise solenoid valve means (31) steered upon opening and closing to feed the jack means.

8. The anchoring harpoon according to claim 1, wherein the cylinder means (4) of the jack include at least two cylinder portions (10, 11) telescoping one in the other and capable of being moved between a retracted position one in the other and an active position with one protruding relative to the other.

9. The anchoring harpoon according to claim 1, wherein the corresponding end of the jack means is associated with the aircraft and a helical return and pressing spring (12) is inserted between said end of the jack and the harpoon head (7).

10. The anchoring harpoon according to claim 9, wherein the helical spring (12) is arranged around the jack means.

11. The anchoring harpoon according to claim 1, further comprising:
   trigger means (15) for prohibiting the movement of the fingers (8, 13, 14) towards the active position when the harpoon head is not positioned abutting in the anchoring grate (2).

12. An anchoring system, in particular for a drone-type rotorcraft comprising an anchoring harpoon according to claim 1.

13. The anchoring harpoon according to claim 2, wherein the bistable actuator (19) includes a wheel with beveled teeth (20) inserted between the control piston (18) and a rod (21) for actuating the fingers, positioned in a sleeve (22) connected to the jack rod, the end of the piston (18) opposite the wheel with beveled teeth (20) itself including teeth (25), so as, when pressure pulses are applied in the jack means and therefore the control piston moves, to cause the beveled toothed wheel (20) to rotate in the sleeve (22), the teeth of the wheel (20) also being adapted to cooperate with successive notches having different heights (26, 27) of the sleeve (22), in order to define stable positions, active and retracted, of the rod (21) for actuating the fingers.

14. The anchoring harpoon according to claim 6, wherein the control means comprise solenoid valve means (31) steered upon opening and closing to feed the jack means.

15. An anchoring harpoon useable with an aircraft and configured to cooperate with an anchoring grate (2) of a platform, comprising:
   a jack (3) comprised of a cylinder (4),
   the cylinder (4) containing a mobile piston (5) moveable within the cylinder (4), the mobile piston (5) having a rod (6) fixedly attached thereto so as to move with the mobile piston (5), a free end of the rod (6) extending past an end of the cylinder (4),
   the free end of the rod (6) connected to a harpoon head (7) configured to hook to the anchoring grate (2),
   said harpoon head (7) comprised of retaining fingers (8, 13, 14) and a control apparatus (9),
   the control apparatus (9) comprised of a control piston (18) and a bistable actuator (19) in engagement with the control piston (18), the bistable actuator (19) configured, in response to successive applications of pressure upon the control piston (18), to alternately move the fingers (8, 13, 14) between a retracted position in a first mode, and an active position in a second mode in which the fingers are deployed to extend radially from an outermost surface of the harpoon head (7).

16. The anchoring harpoon according to claim 15,
   wherein the bistable actuator (19) is located between the control piston (18) and an actuating rod (21), and
   wherein, in the second mode, the bistable actuator (19) urges the actuating rod (21) toward the fingers in order to deploy the fingers.

17. The anchoring harpoon according to claim 16,
   wherein the bistable actuator, in the second mode, urges the actuating rod (21) against a spring (24) located between an end of the actuating rod (21) and an end of the harpoon head (7), and
   wherein the bistable actuator, in the first mode, permits the spring (24) to urge the actuating rod (21) to a position away from the fingers such that the fingers do not deploy.

* * * * *